(12) United States Patent
Bishwas

(10) Patent No.: US 11,492,714 B2
(45) Date of Patent: Nov. 8, 2022

(54) DUAL GAS FLOW DEVICE PROVIDED WITH COOLING FUNCTIONALITY

(71) Applicant: Hymeth ApS, Søborg (DK)

(72) Inventor: Sumon Bishwas, Brøndby Strand (DK)

(73) Assignee: Hymeth ApS, Søborg (DK)

( * ) Notice: Subject to any disclaimer, the term of this patent is extended or adjusted under 35 U.S.C. 154(b) by 0 days.

(21) Appl. No.: 17/593,221

(22) PCT Filed: Mar. 21, 2019

(86) PCT No.: PCT/EP2019/057171
§ 371 (c)(1),
(2) Date: Sep. 13, 2021

(87) PCT Pub. No.: WO2019/180183
PCT Pub. Date: Sep. 26, 2019

(65) Prior Publication Data
US 2022/0090277 A1    Mar. 24, 2022

(30) Foreign Application Priority Data

Mar. 22, 2018 (EP) ..................................... 18163258

(51) Int. Cl.
*C25B 9/73*    (2021.01)
*C25B 9/67*    (2021.01)
(Continued)

(52) U.S. Cl.
CPC .................. *C25B 9/73* (2021.01); *C25B 1/04* (2013.01); *C25B 9/05* (2021.01); *C25B 9/67* (2021.01)

(58) Field of Classification Search
CPC ..................................... C25B 9/67; C25B 9/73
See application file for complete search history.

(56) References Cited

U.S. PATENT DOCUMENTS 4,324,844 A    4/1982 Kothmann
2002/0155333 A1    10/2002 Fitts et al.
(Continued)

FOREIGN PATENT DOCUMENTS

FR    3031753 A1    7/2016

OTHER PUBLICATIONS

Extended European Search Report; Application No. 18163258.9; Completed: Sep. 20, 2018; dated Oct. 1, 2018; 8 Pages.
(Continued)

*Primary Examiner* — Ciel P Contreras
(74) *Attorney, Agent, or Firm* — Whitmyer IP Group LLC

(57) ABSTRACT

A dual gas flow device including: a first cooling plate structure, a second cooling plate structure, a plurality of electrode plates, wherein the first cooling plate structure, the second cooling plate structure and the plurality of electrode plates are arranged in a stacked configuration, wherein the first cooling plate structure forms a first end of the stack and the second cooling plate structure forms a second end of the stack, wherein the plurality of electrode plates are arranged between the first cooling plate structure and the second cooling plate structure, wherein each electrode plate includes a plurality of cooling channels extending through the electrode plate, distributed along a peripheral portion of the electrode plate, each cooling channel being aligned with the corresponding cooling channel of the other electrode plates in the stack, wherein each of the first cooling plate structure and the second cooling plate structure is provided with a plurality of connecting channels, each connecting channel being configured to connect adjacent pairs of cooling channels of the electrode plates, whereby the first cooling plate structure forms a return path for cooling fluid at the first end of the stack and the second cooling plate structure forms a return path for cooling fluid at the second (Continued)

end of the stack enabling cooling fluid to flow through all of the cooling channels.

11 Claims, 6 Drawing Sheets

(51) Int. Cl.
    *C25B 9/05*     (2021.01)
    *C25B 1/04*     (2021.01)

(56) References Cited

U.S. PATENT DOCUMENTS

| | | |
|---|---|---|
| 2005/0072688 A1 | 4/2005 | Meltser |
| 2005/0266296 A1 | 12/2005 | An et al. |
| 2006/0246332 A1 | 11/2006 | Higashi |
| 2008/0171255 A1* | 7/2008 | Brantley ............ H01M 8/2404 |
| | | 429/480 |
| 2009/0169964 A1 | 7/2009 | Ikeda |
| 2016/0233530 A1 | 8/2016 | Mathie et al. |
| 2016/0372765 A1* | 12/2016 | Jones ............... H01M 8/04089 |
| 2017/0098835 A1 | 4/2017 | Poirot-Crouvezier et al. |
| 2017/0247800 A1 | 8/2017 | Lacroix |

OTHER PUBLICATIONS

International Preliminary Report on Patentability; Application No. PCT/EP2019/057171; dated Apr. 23, 2020; 12 Pages.
International Search Report and Written Opinion of the International Searching Authority; Application No. PCT/EP2019/057171; Completed: Jul. 1, 2019; dated Jul. 7, 2019; 11 pages.

* cited by examiner

DUAL GAS FLOW DEVICE PROVIDED WITH COOLING FUNCTIONALITY

TECHNICAL FIELD

The present disclosure relates to dual gas flow devices such as electrolysers and cooling thereof.

BACKGROUND

Electrolysis of water is a process in which water molecules are decomposed, forming hydrogen gas and oxygen gas. This process occurs as a result of an electric current flowing between two electrodes submerged in water.

For certain applications it may be desirable to compress the hydrogen gas and the oxygen gas generated in the electrolysis process. Traditionally, this gas compression has been made once the gas had been discharged from the electrolyser system.

More recently, it has been proposed to perform gas compression already during electrolysis. An example of a high-pressure electrolyser system is disclosed in US 20050072688 A1. The system includes a pump for pumping water into electrolytic cells, a check-valve preventing water to flow back to the pump and an electrolyser stack comprising the electrolytic cells.

Due to the high pressure in the electrolyser, there will be additional heat development inside the electrolyser. The electrical resistivity is thus increased, resulting in a loss of efficiency of the electrolyser.

SUMMARY

In view of the above, a general object of the present disclosure is to provide a dual gas flow device which solves or at least mitigates the problems of the prior art.

There is hence according to a first aspect of the present disclosure provided a dual gas flow device comprising: a first cooling plate structure, a second cooling plate structure, a plurality of electrode plates, wherein the first cooling plate structure, the second cooling plate structure and the plurality of electrode plates are arranged in a stacked configuration, wherein the first cooling plate structure forms a first end of the stack and the second cooling plate structure forms a second end of the stack, wherein the plurality of electrode plates are arranged between the first cooling plate structure and the second cooling plate structure, wherein each electrode plate comprises a plurality of cooling channels extending through the electrode plate, distributed along a peripheral portion of the electrode plate, each cooling channel of the electrode plate being aligned with the corresponding cooling channel of the other electrode plates in the stack, wherein each of the first cooling plate structure and the second cooling plate structure is provided with a plurality of connecting channels, each connecting channel being configured to connect adjacent pairs of cooling channels of the electrode plates, whereby the first cooling plate structure forms a return path for cooling fluid at the first end of the stack and the second cooling plate structure forms a return path for cooling fluid at the second end of the stack enabling cooling fluid to flow through all of the cooling channels.

According to one embodiment the first cooling plate structure and the second cooling plate structure are made of a dielectric material.

According to one embodiment the dielectric material comprises one of a heat conductive polymer, ceramic, aluminium oxide and beryllium oxide.

According to one embodiment every other electrode plate is an anode electrode plate and the remaining electrode plates are cathode electrode plates.

According to one embodiment the dual gas flow device is an electrolyser stack for high-pressure applications.

According to one embodiment each pair of adjacent electrode plate forms an electrolytic cell.

According to one embodiment the first cooling plate structure has a cooling fluid inlet channel connected to a first cooling channel of the cooling channels of the electrode plates and a cooling fluid outlet channel connected to a second cooling channel of the cooling channels of the electrode plates.

According to one embodiment the electrode plates have perimeter surfaces provided with heat fins.

There is according to a second aspect of the present disclosure provided a cooling plate structure comprising: a first cooling plate having a first cooling fluid facing surface provided with a first main fluid channel comprising a plurality of first fins extending along the first main fluid channel, wherein the first fins have a maximal top surface elevation relative to a first bottom surface of the first main fluid channel which is below an elevation of the first cooling fluid facing surface outside the first main fluid channel relative to the first bottom surface, a second cooling plate having a second cooling fluid facing surface provided with a second main fluid channel comprising a plurality of second fins extending along the second main fluid channel, wherein the second fins have a maximal surface elevation relative to a second bottom surface of the second main fluid channel which is below an elevation of the second cooling fluid facing surface outside the second main fluid channel relative to the second bottom surface, wherein the first cooling plate and the second cooling plate are arranged with the first cooling fluid facing surface bearing against the second cooling fluid facing surface, the first main fluid channel mirroring the second main fluid channel, whereby a cooling channel is formed by the first main fluid channel and the second main fluid channel with the first fins and the second fins being spaced apart from each other, and a fluid inlet configured to supply cooling fluid to the cooling channel and a fluid outlet configured to discharge cooling fluid from the cooling channel.

Due to the higher elevation of the two cooling fluid facing surfaces outside the cooling channel relative to the maximum elevation of the first and second fins, a space or gap is formed between the first fins and the second fins which due to the two cooling fluid facing surfaces bearing against each other may be kept constant independently of the pressure being applied to the cooling plate structure.

The fins and the space or gap between the fins provide two possible ways for a fluid to flow in the cooling channel, namely 1) in the narrow fin channels between adjacent first fins or adjacent second fins, and 2) in the space between the edges of the first fins and the second fins, which forms a less narrow single channel. Less pressure and hence less energy may therefore be required for the cooling fluid to be able to flow in the cooling channel from the fluid inlet to the fluid outlet, while a larger cooling surface is provided by means of the first fins and second fins for more efficient cooling.

Additionally, if the cooling fluid has any contamination in it, without the gap it could build up over time and block the narrow fin channels. If a fin channel is blocked anywhere, it also means that the rest of that fin channel is dead since there will not be any flow of fluid through that blocked channel. With the space/gap the fluid flow in the space/gap which is the primary flow channel will be higher than in the fin channels, reducing the risk of blockage due to deposition.

The cooling plate structure may be operated with a gas or a liquid as cooling fluid.

The cooling plate structure may be for an electrolyser stack for high-pressure applications.

According to one embodiment the first fins and the second fins extend along a majority of the length of the cooling channel. The first fins and the second fins may for example extend the entire way of the cooling channel, from the fluid inlet to the fluid outlet.

One embodiment comprises a plurality of said cooling channels extending between the fluid inlet and the fluid outlet.

According to one embodiment the first fins extend in parallel with each other.

The first fins may for example extend parallel with the contour of the first main fluid channel, or they may have an undulating or wave-like shape such as a sinusoidal shape inside the first main fluid channel.

According to one embodiment the second fins extend in parallel with each other.

The second fins may for example extend parallel with the contour of the second main fluid channel, or they may have an undulating or wave-like shape such as a sinusoidal shape inside the second main fluid channel.

According to one embodiment the first fins mirror the second fins. The first fins may hence be aligned with the second fins along their extension in the cooling channel. Each first fin may hence be aligned with a corresponding second fin.

One embodiment comprises sealing members configured to seal the cooling channel.

According to one embodiment the first cooling plate has first sealing member grooves following the outline of the first main fluid channel on a respective side thereof and the second cooling plate has second sealing member grooves following the outline of the second main fluid channel on a respective side thereof, wherein the sealing members are arranged in the first sealing member grooves and the second sealing member grooves to seal the cooling channel. Hereto, a first sealing member is arranged in facing one set of first and second sealing member grooves and a second sealing member is arranged in facing another set of first and second sealing member grooves.

According to one embodiment the sealing members are dimensioned so relative to the depth of the first sealing member grooves and the depth of the second sealing member grooves that the first cooling fluid facing surface bears against the second cooling fluid facing surface.

According to one embodiment the first cooling plate and the second cooling plate are made of a dielectric material.

According to one embodiment the dielectric material comprises one of heat conductive polymer, ceramic, aluminium oxide and beryllium oxide.

According to one embodiment the cooling inlet and cooling outlet are arranged at opposite ends of the cooling plate structure.

There is according to a third aspect of the present disclosure provided an electrolyser stack for high-pressure applications comprising: a plurality of electrolytic cells, and a plurality of cooling plate assemblies according to the first aspect, wherein the cooling plate assemblies are arranged alternatingly with the electrolytic cells.

According to one embodiment each cooling plate structure has a hydrogen gas channel connected to a hydrogen channel of the electrolytic cells and an oxygens gas channel connected to an oxygen channel of the electrolytic cells.

According to one embodiment each cooling plate structure has a first water channel connected to a first water channel of the electrolytic cells and a second water channel connected to a second water channel of the electrolytic cells.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Examples of the concept will now be described, by way of example, with reference to the accompanying drawings, in which.

DETAILED DESCRIPTION

Figure 1:
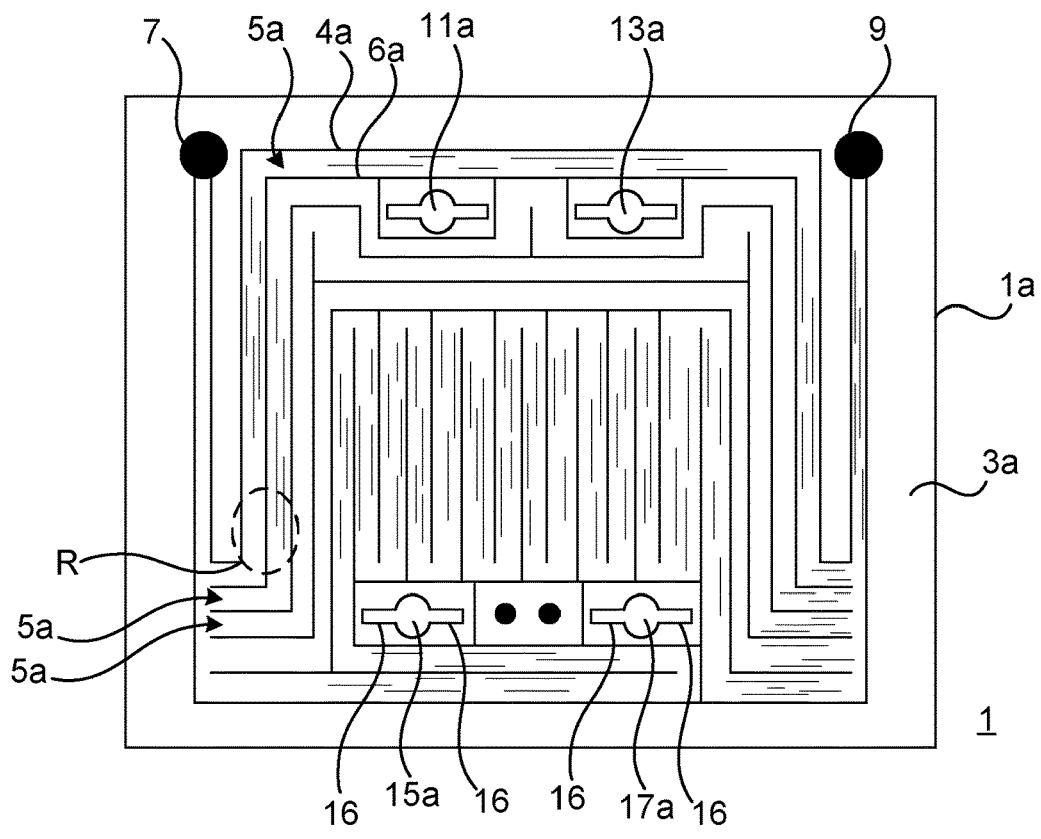
FIG. 1 schematically shows a front view of an example of a cooling plate structure having been separated into a first cooling plate and a second cooling plate.
Figure 1:
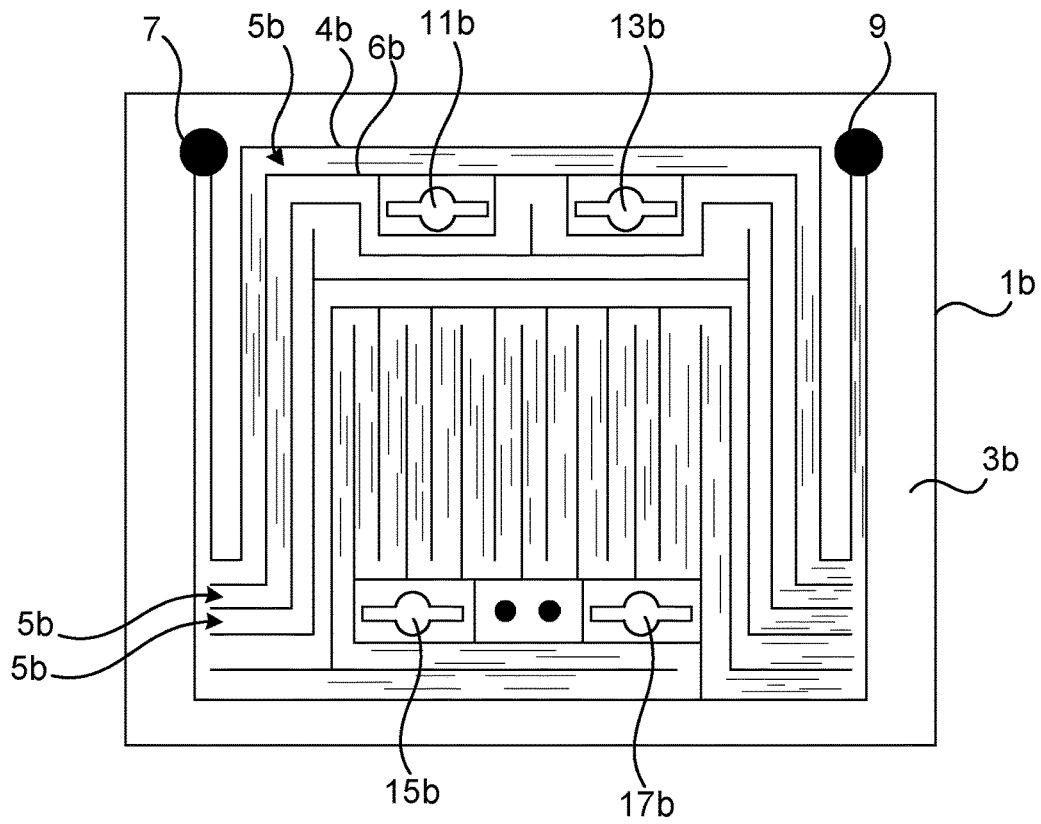

FIG. 1 depicts an example of a cooling plate structure 1. The cooling plate structure 1 may advantageously be used for high-pressure applications. The cooling plate structure 1 comprises a first cooling plate 1a and a second cooling plate 1b.

The first cooling plate 1a has a first cooling fluid facing surface 3a. The first cooling fluid facing surface 3a is provided with a first main fluid channel 5a. The exemplified first cooling plate 1a is provided with a plurality of such first main fluid channels 5a.

Each first main fluid channel 5a is flanked by first sealing member grooves 4a, 6a.

The second cooling plate 1b has a second cooling fluid facing surface 3b. The second cooling fluid facing surface 3b is provided with a second main fluid channel 5b. The exemplified second cooling plate 1b is provided with a plurality of such second main fluid channels 5b.

Each second main fluid channel 5b is flanked by second sealing member grooves 4b, 6b.

The first cooling plate 1a and the second cooling plate 1b are configured to be assembled with each other with the first cooling fluid facing surface 3a facing and bearing against the second cooling fluid facing surface 3b.

Each corresponding first main cooling channel 5a and second main cooling channel 5b are mirrored and hence aligned. These channels 5a, 5b hence form identical patterns so that when the first cooling plate 1a is assembled with the second cooling plate 1b, a respective fluid channel is formed between facing first main cooling channels 5a and second main cooling channels 5b.

Each of the first cooling plate 1a and the second cooling plate 1b has a fluid inlet 7 and a fluid outlet 9. The fluid inlet 7 and the fluid outlet 9 forms a fluid inlet and a fluid outlet of the cooling plate structure 1 to the fluid channels formed by the facing first main cooling channels 5a and second main cooling channels 5b. Hereto, all of the first main fluid channels 5a extend between the fluid inlet 7 and the fluid outlet 9 of the first cooling plate 1a. All of the first main fluid channels 5a are hence in fluid communication or fluid connection with the fluid inlet 7 and the fluid outlet 9. All of the second main fluid channels 5b extend between the fluid inlet 7 and the fluid outlet 9 of the second cooling plate 1b. All of the second main fluid channels 5b are hence in fluid communication or fluid connection with the fluid inlet 7 and the fluid outlet 9.

The fluid inlet 7 of the first cooling plate 1a may be a through-opening extending through the first cooling plate 1a. The fluid outlet 9 of the first cooling plate 1a may be a through-opening extending through the first cooling plate 1a. The fluid inlet 7 and the fluid outlet 9 may be arranged at opposite sides, ends or corner regions of the first cooling plate 1a, in its perimeter region to allow for a long extension of the first main cooling channels 5a along the first cooling fluid facing surface 3a.

The fluid inlet 7 of the second cooling plate 1b may be a through-opening extending through the second cooling plate 1b. The fluid outlet 9 of the second cooling plate 1b may be a through-opening extending through the second cooling plate 1b. The fluid inlet 7 and the fluid outlet 9 may be arranged at opposite sides, ends or corner regions of the second cooling plate 1b, in its perimeter region to allow for a long extension of the second main cooling channels 5b along the second cooling fluid facing surface 3b.

The fluid inlets 7 of the first cooling plate 1a and the second cooling plate 1b are aligned, thus forming the fluid inlet of the cooling plate structure 1. The fluid outlets 9 of the first cooling plate 1a and the second cooling plate 1b are aligned, thus forming the fluid outlet of the cooling plate structure 1.

The first cooling plate 1a is provided with a first gas channel 11a and a second gas channel 13a. These are sealed off from the first main fluid channels 5a, and are hence not in fluid communication with the first main fluid channels 5a. The first gas channel 11a and the second gas channel 13a extends through the first cooling plate 1a and hence have longitudinal extensions perpendicular to that of a direction of extension of the first main fluid channels 5a.

The second cooling plate 1b is provided with a third gas channel 11b and a fourth gas channel 13b. These are sealed off from the second main channels 5b, and are hence not in fluid communication with the second main fluid channels 5b. The third gas channel 11b and the fourth gas channel 13b extends through the second cooling plate 1b and hence have longitudinal extensions perpendicular to that of a direction of extension of the second main fluid channels 5b.

The first gas channel 11a is aligned with the third gas channel 11b. The second gas channel 13a is aligned with the fourth gas channel 13b. Hereto, the same first gas flow flows through the first gas channel 11 and the same second gas flow flows through the second gas channel 11b and the fourth gas channel 13b.

The first gas channel 11a and the third gas channel 11b form an oxygen gas channel of the cooling plate structure 1 and the second gas channel 11b and the fourth gas channel 13b form a hydrogen gas channel of the cooling plate structure 1.

The first cooling plate 1a is provided with a first water channel 15a and a second water channel 17a. These are sealed off from the first main channels 5a, and are hence not in fluid communication with the first main fluid channels 5a. The first water channel 15a and the second water channel 17a extend through the first cooling plate 1a in the thickness direction thereof.

The second cooling plate 1b is provided with a first water channel 15b and a second water channel 17b. These are sealed off from the second main channels 5b, and are hence not in fluid communication with the second main fluid channels 5b. The first water channel 15b and the second water channel 17b extend through the second cooling plate 1b in the thickness direction thereof.

The first water channel 15a of the first cooling plate 1a is aligned with the first water channel 15b of the second cooling plate 1b thereby forming a first water channel of the cooling plate structure 1. The second water channel 17a of the first cooling plate 1a is aligned with the second water channel 17b of the second cooling plate 1b thereby forming a second water channel of the cooling plate structure 1. Hereto, a first water flow is able to flow through the first water channels 15a and 15b and a second water flow is able to flow through the second water channels 17a and 17b.

The first water channels 15a, 15b have a central channel portion and two oppositely arranged lateral fins 16 which are narrower compared to the central channel portion. The second water channels 17a, 17b have a central channel portion and two oppositely arranged lateral fins 16 which are narrower compared to the central channel portion. The first gas channel 11a, the second gas channel 13a, the third gas channel 11b and the fourth gas channel 13b may also have this configuration, as shown in FIG. 1.

The first cooling plate 1a and the second cooling plate 1b are preferably made of a dielectric material. The dielectric material preferably has good heat conducting properties. The dielectric material may for example comprise or consist of a heat conductive polymer, ceramic, aluminium oxide or beryllium oxide. As an alternative to dielectric material, the first cooling plate 1a and the second cooling plate 1b could be made of for example metal, such as copper, aluminium or any other metal with good heat conducting properties. In case the cooling plates assembly is to be used in applications with electric potential differences involved and fluids/liquids with good current carrying capabilities, it is preferred that the cooling plate structure is made of a dielectric material.

The cooling plate structure 1 furthermore comprises sealing members configured to seal the first main fluid channels 5a and the second main fluid channels 5b so that the fluid flowing in these channels does not leak to any adjacent channel, as will be elaborated upon in the following.

Figure 2A:
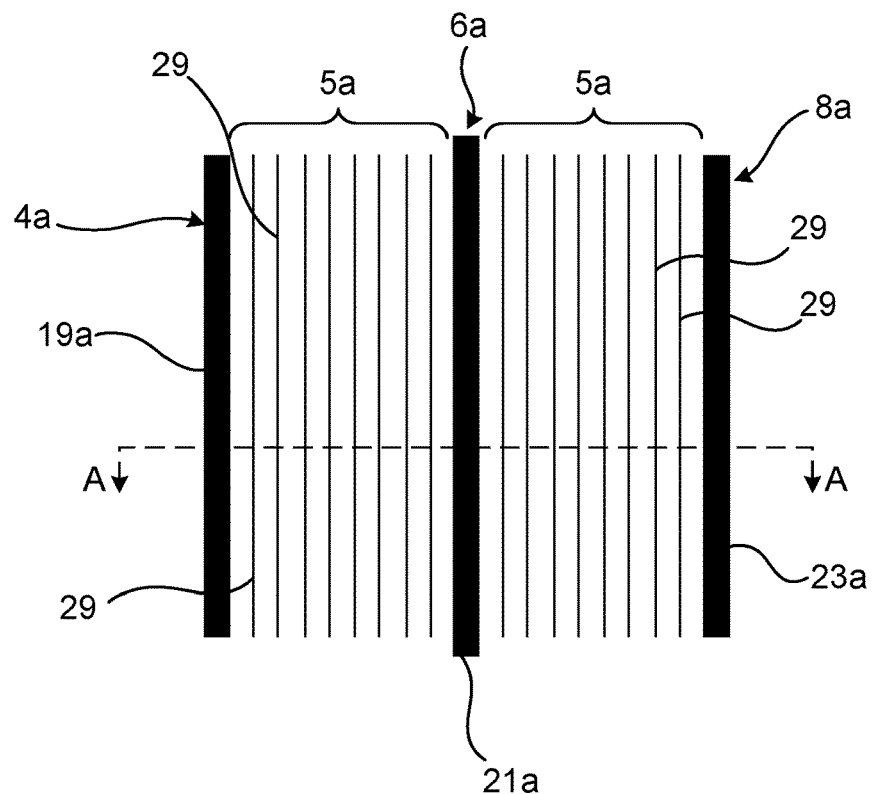
FIG. 2a schematically shows a close-up view of region R in FIG. 1.

Turning now to FIG. 2a, a close-up of region R in FIG. 1 is shown. This close-up shows two adjacent first main fluid channels 5a. The left hand side first main fluid channel 5a in FIG. 2a is flanked by first sealing member grooves 4a and 6a and the right hand side first main fluid channel 5a is flanked by first sealing member grooves 6a and 8a. A respective sealing member 19a-23a is arranged in the first sealing member grooves 4a, 6a and 8a.

The second cooling plate 1b may have the same structure as the first cooling plate 1a with regards to the second sealing member grooves.

The sealing members 19a-23a may be resilient. The sealing members 19a-23a may for example be made of rubber or polymer.

Each first main fluid channel 5a is provided with a plurality of first fins 29. The first fins 29 of a first main fluid channel 5a extend along that first main fluid channel 5a. In the present example, the first fins 29 extend in parallel with the longitudinal extension of the first main channel 5a in which they are provided. The first fins 29 may extend along the entire length of the first main channels 5a, from the fluid inlet 7 to the fluid outlet 9.

Figure 2B:
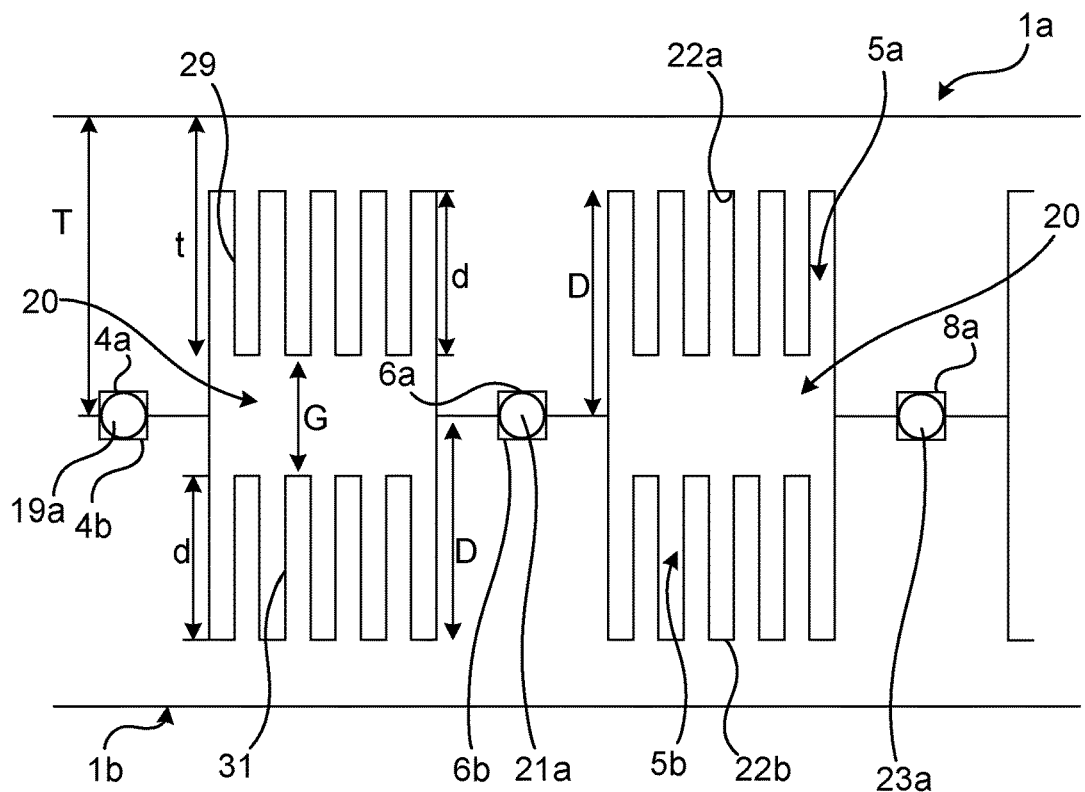
FIG. 2b schematically shows a cross-section of a cooling plate structure along lines A-A.

With reference to FIG. 2b, a cross-section of the cooling plate structure 1 along lines A-A when the first cooling plate 1a and the second cooling plate 1b have been assembled with each other.

Each second main fluid channel 5a is provided with a plurality of second fins 31. The second fins 31 of a second main fluid channel 5b extend along that second main fluid channel 5b. In the present example, the second fins 31 extend in parallel with the longitudinal extension of the second main channel 5b in which they are provided. The second fins 31 may extend along the entire length of the second main channels 5b, from the fluid inlet 7 to the fluid outlet 9.

A fluid channel 20 is formed by the first main fluid channel 5a between the sealing members 19a and 21a, and another fluid channel 20 is formed between the sealing members 21a and 23a.

The first fins 29 and the second fins 31 of a cooling channel 20 may mirror each other as they extend along the fluid channel 20. To this end, corresponding first fins 29 and second fins 31 of a cooling channel may be aligned along their entire extension.

The first fins 29 have a maximal top surface elevation d relative to a first bottom surface 22a of the first main fluid channel 5a in which they are provided, which is below an elevation D of the first cooling fluid facing surface 3a outside the first main fluid channel 5a relative to the first bottom surface 22a. Hereto, the thickness t of the first cooling plate 1a is thinner at the top edge of the first fins 29 than the thickness T of the first cooling plate 1a at the first cooling fluid facing surface 3a.

The second fins 31 have a maximal top surface elevation d relative to a second bottom surface 22b of the second main fluid channel 5b in which they are provided, which is below an elevation D of the second cooling fluid facing surface 3b outside the second main fluid channel 5b relative to the second bottom surface 22b. Hereto, the thickness of the second cooling plate 1b is thinner at the top edge of the second fins 31 than the thickness of the second cooling plate 1b at the first cooling fluid facing surface 3a.

Due to the lower maximal top surface or edge elevation of the first fins 29 and the second fins 31, a gap G is formed between the first fins 29 and the second fins 31 facing the first fins 29 in a cooling channel.

The first sealing member grooves 4a, 6a, 8a, the second sealing member grooves 4b, 6b and the sealing members 19a-23a may be dimensioned so that the first cooling fluid facing surface 3a and the second cooling fluid facing surface 3b bear against each other when the first cooling plate 1a and the second cooling plate 1b have been assembled with each other. The size of the gap G will thus not be dependent of the pressure to which the cooling plate structure 1 is being subjected to. The size of the gap G will only be determined by the thicknesses t and T.

The first cooling plate 1a and the second cooling plate 1b may be assembled with each other by means of fasteners such as screws, preferably made of a dielectric material. The first cooling plate 1a and the second cooling plate 1b may also be subjected to a heating process, e.g. to welding to join them.

Figure 3:
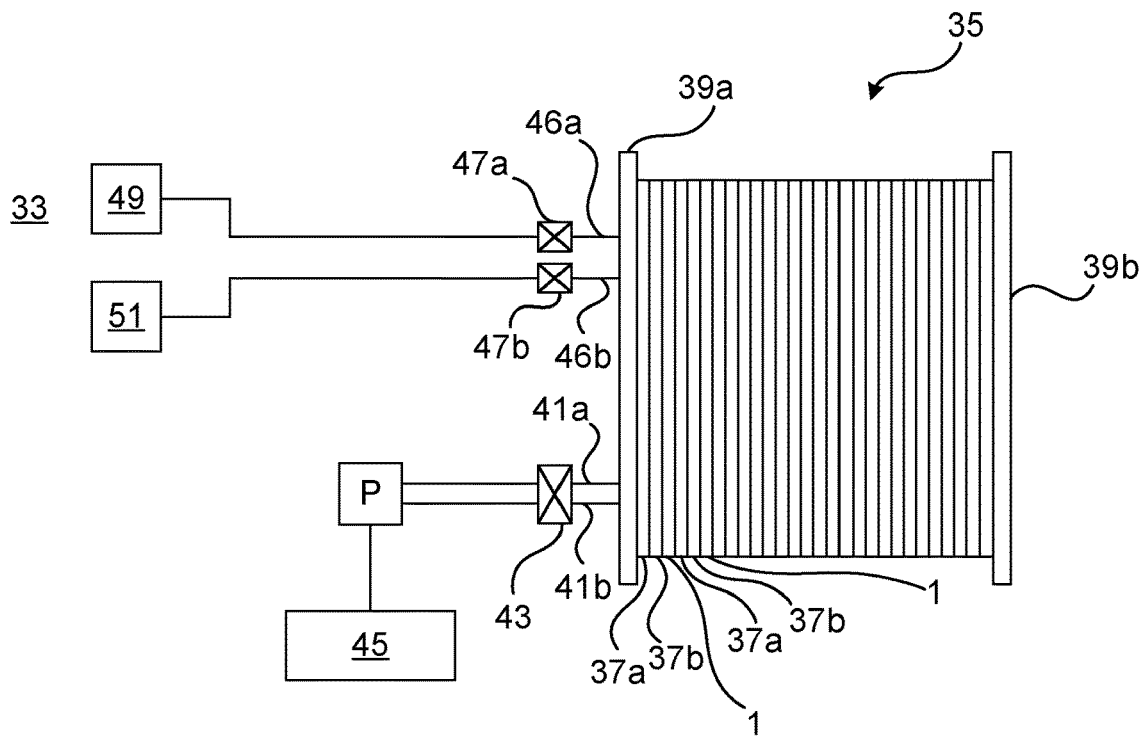
FIG. 3 schematically shows an example of a high-pressure electrolyser system.

FIG. 3 shows an example of a high-pressure electrolyser system 33. The high-pressure electrolyser system 33 comprises an electrolyser stack 35. The electrolyser stack 25 includes a plurality of electrode plates 37a and 37b and a plurality of cooling plates 1. Each adjacent pair of electrode plates, cathode and anode, forms an electrolytic cell. Hence, each electrode plate 37a and 37b is operated either as a cathode or as an anode. The cooling plate assemblies 1 are arranged alternatingly with the electrolytic cells. To this end, a cooling plate structure 1 is located between each pair of electrolytic cell.

Each electrode plate 37a and 37b has a frame structure comprising an inner frame and an outer frame, whereby a space is formed inside the inner frame. When the electrode plates 37a and 37b are stacked an electrolysis chamber configured to be filled with water is formed by the adjacent spaces.

The electrolyser stack 35 furthermore comprises a plurality of membranes. Each pair of electrode plates 27a and 27b forming an electrolytic cell is separated by a membrane so that each cathode forms a hydrogen chamber and each anode forms an oxygen chamber. The oxygen chambers and hydrogen chambers together form the electrolysis chamber. The membranes are configured to prevent hydrogen gas and oxygen gas to move between the electrode plates 37a and 37b in the electrolysis chamber.

The electrolyser stack 35 comprises a first end plate 39a forming a first end of the electrolyser stack 35 and a second end plate 39b forming a second end of the electrolyser stack 35. The electrolytic cells and the cooling plate assemblies 1 are arranged between the first end plate 39a and the second end plate 39b.

The first end plate 39a is provided with two water inlets 41a configured to enable water to flow into the electrolysis chamber. The high-pressure electrolyser system 33 furthermore comprises two water inlet valves 43, one for each water inlet 41a, 41b, configured to provide a check-valve functionality of a respective water inlet 41a, 4ab, a pump P and a pump controller 45.

The pump P is configured to pump water into the electrolyser stack 35 via the water inlets 41a, 41b. The pump controller 45 is configured to control the pump P. For example, the pump controller 45 may be configured to operate the pump P only occasionally, such as once every hour. The pump controller 45 may hence use a timer function. The pump P may thus top up the water level in the electrolyser stack 35, which may hence be completely filled with water e.g. once every hour. Alternatively, other time frames may be used to to operate the pump P by means of the pump controller 45. By operating the pump P only occasionally, energy may be saved while operating the high-pressure electrolyser system 33. Alternatively, the high-pressure electrolyser system may include one or more sensors to detect the water level in the electrolyser stack, wherein the pump controller 45 may be configured to control the pump based on the water level detected by the one or more sensors. As yet another alternative, the pump P could run at all times.

The electrolyser stack 35 further comprises an oxygen gas outlet 46a and a hydrogen gas outlet 46b. The high-pressure electrolyser system 33 may also comprise a pressure compensating system connected to the oxygen gas outlet 46a and to the hydrogen gas outlet 46b, to provide pressure equalisation between the oxygen gas flow and the hydrogen gas flow.

The high-pressure electrolyser system 33 may furthermore comprise gas outlet valves 47a, 47b, which may be check-valves. The gas outlet valves 47a, 47b may be configured to allow a certain restricted gas flow of hydrogen gas and oxygen gas to flow out from the electrolyser stack 35 via the oxygen gas outlet 46a and the hydrogen gas outlet 46b.

Figure 4:
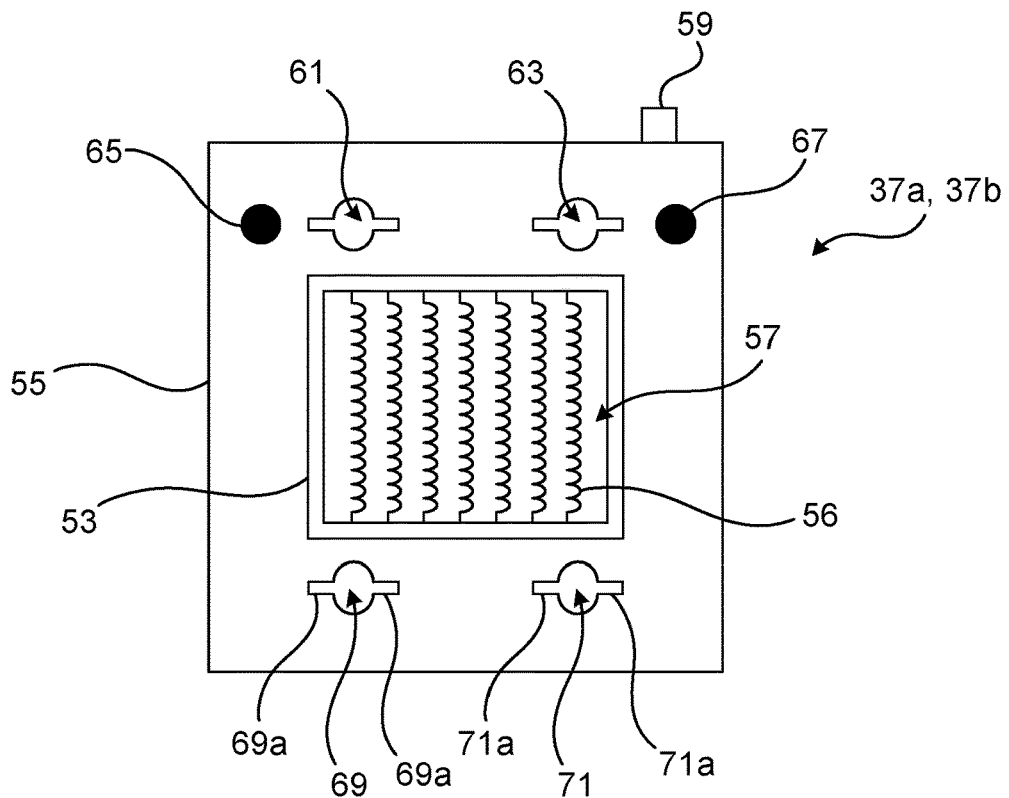
FIG. 4 schematically shows a front view of an example of an electrode plate.

The oxygen gas outlet 46a may be connected to an oxygen gas pressure vessel 49 for storing the compressed oxygen gas and the hydrogen gas outlet 46b may be connected to a hydrogen gas pressure vessel 51 for storing the compressed hydrogen gas. FIG. 4 depicts an example of an electrode plate 37a or 37b. The exemplified electrode plate has an inner frame 53 and an outer frame 55. The inner frame 53 is preferably made of a metal with good electrical conducting properties, for example copper or aluminium. The inner frame 53 may hence be an inner metal frame. The outer frame 55 may be made of a heat conducting polymer. The outer frame 55 may hence be an outer heat conducting polymer frame. The outer frame 55 holds the inner frame 53. The outer frame 55 may for example be made by means of injection moulding. To this end, during manufacturing the inner frame may be placed inside an injection mould, wherein a heat conducting polymer is injected into the frame to form the outer frame 55.

The electrode plate 37a, 37b furthermore comprises electrode elements 56 extending between opposite sides of the inner frame 53 and hence also of the outer frame 55. The inner frame 53 delimits a space 57 in the region where the electrode elements 56 extend. This space 57 is an oxygen chamber in case the electrode plate is operated as an anode and a hydrogen chamber in case the electrode plate is operated as a cathode. The electrode plate 37a, 37b has a terminal 59 which is connected to the electrode elements 56 via the inner frame 53 and which is configured to be connected to a power supply.

The outer frame 55 is provided with an oxygen channel 61 and a hydrogen channel 63. Only one of these two channels 61 and 63 is configured to be in fluid communication with the space 57. In case the electrode plate is operated as an anode only the oxygen channel 61 is in fluid communication with the space 57 and in case the electrode plate is operated as a cathode only the hydrogen channel 63 is in fluid communication with the space 57. Since the electrode plates 37a and 37b are arranged with a membrane covering the space 57 between them, every other electrode plate, i.e. every anode, will contribute to the oxygen gas stream in the oxygen channel 61 and every other plate, i.e. every cathode, will contribute to the hydrogen gas stream in the hydrogen channel 63.

In addition to the membranes, the electrolyser stack 35 may comprise a plurality of electrically insulating sealing members, each being sandwiched between two adjacent electrode plates 37a and 37b to provide electrical insulation and sealing between the electrode plates 37a and 37b.

The oxygen gas channels 11a, 11b of the cooling plate assemblies 1 are connected to the oxygen channels 61 of the electrode plates 37a, 37b. The oxygen gas channels 11a, 11b are hence aligned with the oxygen channels 61. The hydrogen gas channels 13a, 13b of the cooling plate assemblies 1 are connected to the hydrogen channels 63 of the electrode plates 37a, 37b. The hydrogen gas channels 13a, 13b are hence aligned with the hydrogen channels 63.

Each electrode plate 37a, 37b may be provided with a cooling fluid inlet 65 and a cooling fluid outlet 67. The cooling fluid inlet 65 is a through-opening configured to be aligned with the fluid inlets 7 of the cooling plate assembles 1. The cooling fluid outlet 67 is a through-opening configured to be aligned with the fluid outlets 9 of the cooling plate assemblies 1.

The first end plate 39a may be provided with a cooling fluid inlet connected to the cooling fluid inlets 65 of the electrode plates 37a, 37b and to the fluid inlets 7 of the cooling plate assemblies 1. The second end plate 39b may be provided with a first cooling fluid outlet connected to the cooling fluid outlets 67 of the electrode plates 37a, 37b and to the fluid outlets 9 of the cooling plate assemblies 1. The second end plate 39 may also be provided with a second cooling fluid outlet connected to the cooling fluid inlets 65 of the electrode plates 37a, 37b and to the fluid inlets 7 of the cooling plate assemblies 1 to discharge the cooling fluid which has not flown through the cooling channels of the cooling plate assemblies 1 from the electrolyser stack 35.

Each electrode plate 37a, 37b may also comprise two water channels 69 and 71. A first water channel 69 of the two water channels may be connected to one of the water inlets 41a, 41b and a second water channel 71 of the two water channels may be connected to the other one of the water inlets 41a, 41b. For an electrode plate 37a acting as anode the first water channel 69 is in fluid communication with the space 57 by means of a channel extending from the first water channel 69 to the space 57, while the second water channel 71 is not. For an electrode platen 47b acting as cathode the second water channel 71 is in fluid communication with the space 57 by means of a channel extending from the second water channel 71 to the space 57, while the first water channel 69 is not. This means that the anodes have their own water supply and the cathodes have their own water supply. This reduces the risk of cross-contamination between oxygen chambers and hydrogen chambers.

The first water channels of the cooling plate assemblies 1 formed by the first water channels 15a, 15b of the first cooling plates 1a and the second cooling plates 1b, respectively, are connected to the first water channels 69 of the electrode plates 37a, 37b. The first water channels of the cooling plate assemblies 1 are aligned with the first water channels 69 of the electrode plates 37a, 37b.

The second water channels of the cooling plate assemblies 1 formed by the second water channels 17a, 17b of the first cooling plates 1a and the second cooling plates 1b, respectively, are connected to the second water channels 71 of the electrode plates 37a, 37b. The second water channels of the cooling plate assemblies 1 are aligned with the second water channels 71 of the electrode plates 37a, 37b.

Water can thereby be transported throughout the electrolyser stack 35 through all of the electrode plates 37a, 37b.

The first water channel 69 has a central channel portion and two oppositely arranged lateral fins 69a which are narrower compared to the central channel portion. The second water channel 71 has a central channel portion and two oppositely arranged lateral fins 71a which are narrower compared to the central channel portion. This provides the effect that the same or essentially the same water pressure can be provided along the length of the first water channel 69 and the second water channel 71 as they extend along the electrolyser stack 35. The oxygen channel 61 and the hydrogen channel 63 may according to one variation also have this configuration.

Figure 5:
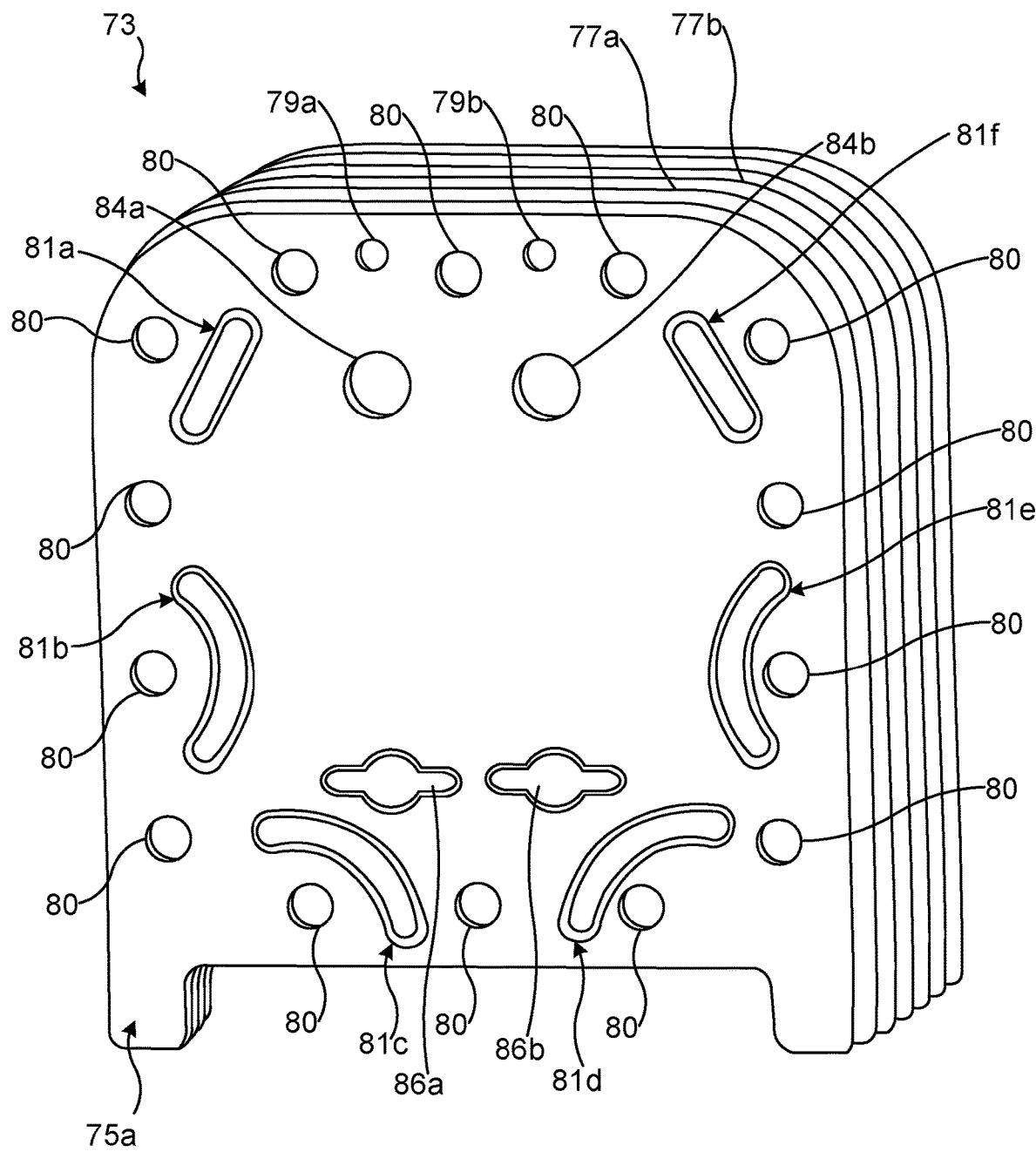
FIG. 5 schematically shows a perspective view of a dual gas flow device from a first side.

FIG. 5 shows a perspective view of an example of a dual gas flow device 73. The dual gas flow device 73 will in the following be exemplified by an electrolyser stack for high-pressure applications.

Figure 6:
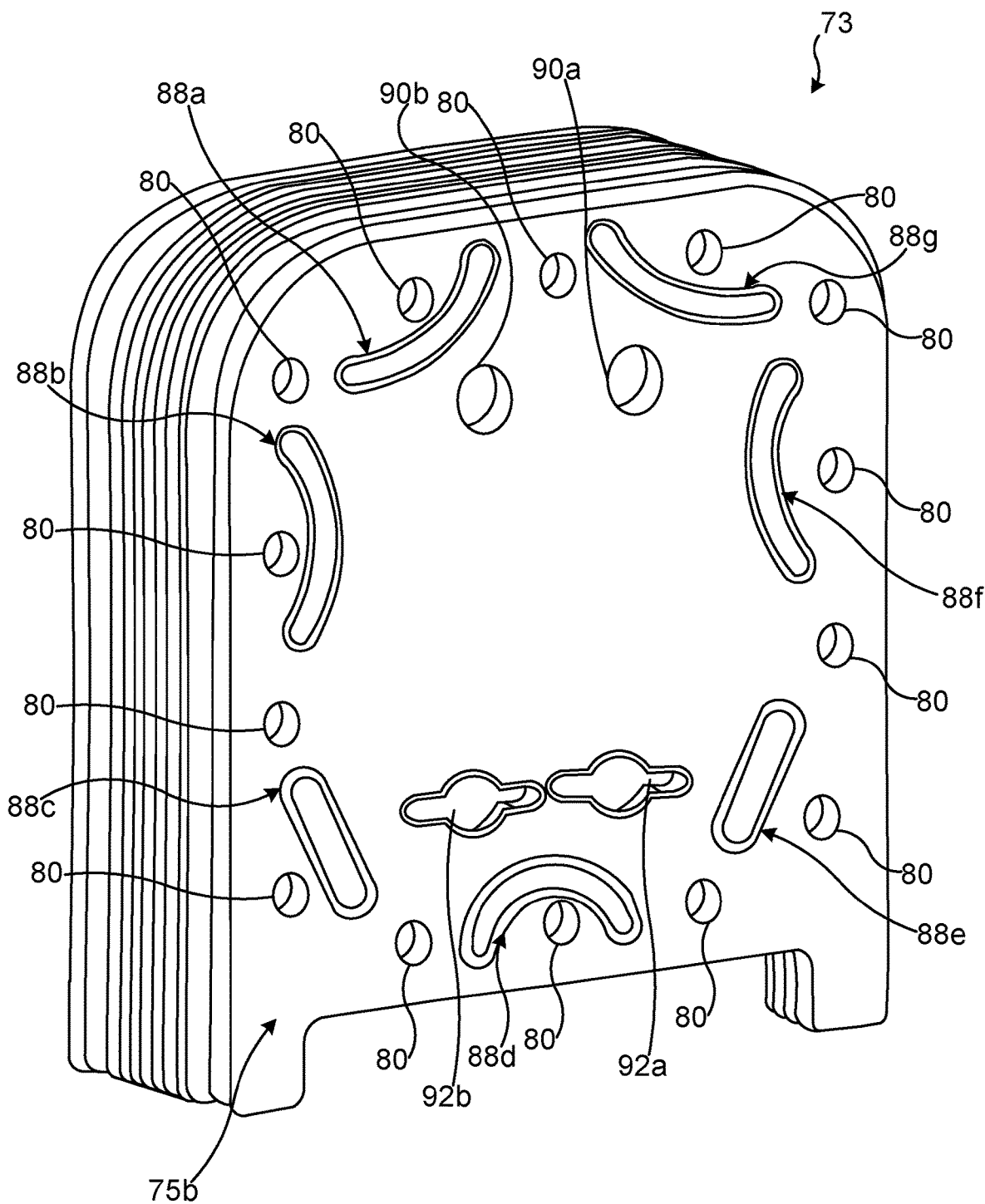
FIG. 6 schematically shows a perspective view of the dual gas flow device in FIG. 5 from a second side opposite to the first side.

The dual gas flow device 73 comprises a first cooling plate structure or device 75a and a second cooling plate structure or device 75b, shown in FIG. 6. The dual gas flow device 73 furthermore comprises a plurality of electrode plates 77a, 77b. The first cooling plate structure 75a, the electrode plates 77a, 77b, and the second electrode plate device 75b are arranged in a stacked configuration. The first cooling plate structure 75a forms a first end of the stack and the second cooling plate structure 75b forms a second end of the stack. The electrode plates 77a and 77b are arranged between the first cooling plate structure 75a and the second cooling plate structure 75b.

Each of the first cooling plate structure 75a and the second cooling plate structure 75b may comprise a plurality of through-openings 80 distributed along a peripheral portion of the first cooling plate structure 75a and the second cooling plate structure 75b, respectively. The through-openings 80 are configured to receive fastening members such as compression rods, to hold the first cooling plate structure 75a, the second cooling plate structure 75b and the plurality of electrode plates 77a and 77b in the stacked configuration.

The first cooling plate structure 75a has a cooling fluid inlet 79a and a cooling fluid outlet 79b. Each of the cooling fluid inlet 79a and the cooling fluid outlet 79b may be a through-opening extending through the first cooling plate structure 75a. The cooling fluid inlet 79a and the cooling fluid outlet 79b may be provided in a peripheral portion of the first cooling plate structure 75a.

The cooling fluid inlet 79a and the cooling fluid outlet 79b may according to one example each be provided with a plurality of radially inwards extending fins.

The first cooling plate structure 75a furthermore comprises a plurality of connecting channels 81a-81f. The connecting channels 81a-81f are distributed along a peripheral portion of the first cooling plate structure 75a.

The connecting channels 81a-81f may according to one example be provided with internal heat fins.

With a peripheral portion of the first cooling plate structure 75a is herein generally meant an edge region of the cooling plate structure 75a, extending around the first cooling plate structure 75a in the peripheral direction thereof. The peripheral portion or edge region is hence not along the outer boundary or perimeter, i.e. the sides or faces extending between the front and back face of the first cooling plate structure 75a. The edge region is on the front face or back face of the first cooling plate structure 75a. This applies correspondingly to the second cooling plate structure 75b and the electrode plates 77a and 77b.

The connecting channels may for example have a straight extension or they may be curved in the plane defined by the first cooling plate structure 75a. Some of the connecting channels may for example have a straight extension and some of the connecting channels may have a curved extension. Some of the connecting channels may for example be curved to avoid an adjacent through-opening 80 also located in the peripheral portion of the first cooling plate structure 75a.

The first cooling plate structure 75a may comprise a single cooling plate or two cooling plates facing each other.

The first cooling plate structure 75a has a first gas channel 84a and a second gas channel 84b extending through the first cooling plate structure 75a. The first gas channel 84a may be an oxygen gas channel and the second gas channel 84b may be a hydrogen gas channel.

The first cooling plate structure 75a has a first water channel 86a and a second water channel 86b extending through the first cooling plate structure 75a. The first water channel 86a and the second water channel 86b are arranged vertically lower than the first gas channel 84a and the second gas channel 84b when the dual gas flow device 73 is in a position of normal use.

FIG. 6 shows a perspective view of the dual gas flow device 73 depicting the second cooling plate structure 75b.

The second cooling plate structure 75b comprises a plurality of connecting channels 88a-88g. The connecting channels 88a-88g are distributed along a peripheral portion of the second cooling plate structure 75b. The connecting channels 88a-88g may for example have a straight extension in the plane defined by the second cooling plate structure 75b or they may be curved. Some of the connecting channels may for example have a straight extension and some of the connecting channels may have a curved extension. Some of the connecting channels may for example be curved to avoid an adjacent through-opening 80 also located in the peripheral portion of the second cooling plate structure 75b.

The connecting channels 88a-88g may according to one example be provided with internal heat fins.

The second cooling plate structure 75b may comprise a single cooling plate or two cooling plates facing each other.

The second cooling plate structure 75b has a third gas channel 90a and a fourth gas channel 90b extending through the second cooling plate structure 75b. The third gas channel 90a may be an oxygen gas channel and the fourth gas channel 90b may be a hydrogen gas channel.

The third gas channel 90a is arranged aligned with the first gas channel 84a and the fourth gas channel 90b is arranged aligned with the second gas channel 84b of the first cooling plate structure 75a.

The second cooling plate structure 75b has a third water channel 92a and a fourth water channel 92b extending through the second cooling plate structure 75b. The third water channel 92a and the fourth water channel 92b are arranged vertically lower than the third gas channel 90a and the fourth gas channel 90b when the dual gas flow device 73 is in a position of normal use.

The third water channel 92a is arranged aligned with the first water channel 86a and the fourth water channel 92b is arranged aligned with the second water channel 86b.

The perimeters or outer boundary surfaces of the first cooling plate structure 75a and the second cooling plate structure 75b may be provided with heat fins.

Each one of the first cooling plate structure 75a and the second cooling plate structure 75b may for example be made of a dielectric material such as a heat conducting polymer, ceramic, sapphire, aluminium oxide or beryllium oxide, or any other inert dielectric material with good heat conducting properties.

Figure 7:
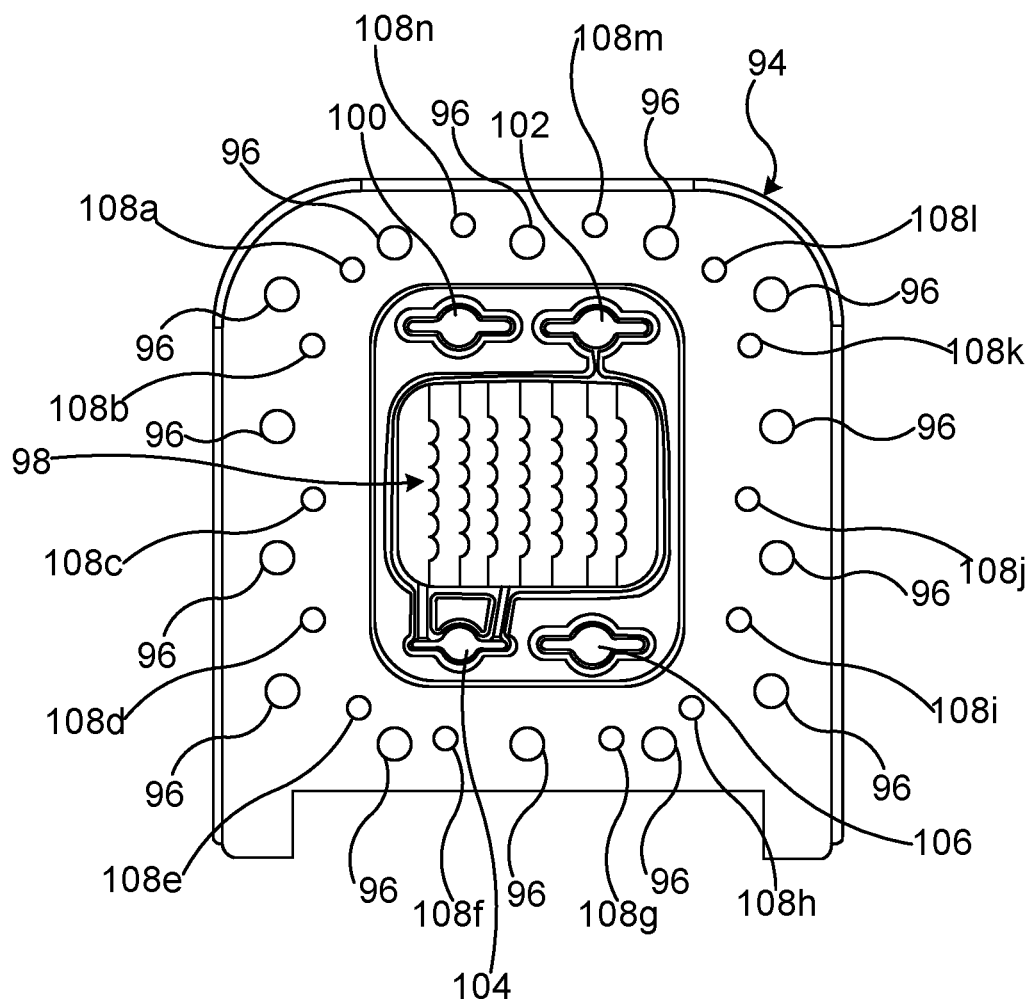
FIG. 7 schematically shows a front view of an example of an electrode plate of the dual gas flow device in FIG. 5.

FIG. 7 shows a front view of an example of an electrode plate 77a. The exemplified electrode plate 77a has a frame 94. The frame 94 may for example comprise an inner metal structure, for example copper, or aluminium. The inner metal structure may be coated with a heat conducting polymer.

The frame 94 is provided with a plurality of through-openings 96 distributed along a peripheral portion of the electrode plate 77a. The through-openings 96 are configured to be aligned with corresponding through-openings 80 of the first cooling plate structure 75a and the second cooling plate structure 75b. The through-openings 96 of the electrode plate 77a are configured to receive respective fastening members also extending through the first cooling plate structure 75a and the second cooling plate structure 75b.

The frame 94 defines an inner space 98 comprising a plurality of electrode elements 98 extending between opposite sides of an inner surface of the frame 94. Each electrode elements 98 may comprise a coil and a straight wire.

The electrode plate 77a comprises an oxygen channel 100 and a hydrogen channel 102. The oxygen channel 100 is aligned with and connected to the first gas channel 84a of the first cooling plate structure 75a and to the third gas channel 90a of the second cooling plate structure 75b. The hydrogen channel 102 is aligned with and connected to the second gas channel 84b of the first cooling plate structure 75a and the fourth gas channel 90b of the second cooling plate structure 75b. For the exemplified electrode plate 77a, the hydrogen channel 102 is connected to the inner space 98. The hydrogen channel 102 is hence in fluid communication with the inner space 98. The oxygen channel 102 is not connected to the inner space 98.

The electrode plate 77a furthermore comprises two water channels 104 and 106. The water channel 104 is aligned with and connected to the first water channel 86a of the first cooling plate structure 75a and the third water channel 92a of the second cooling plate structure 75b. The water channel 106 is aligned with and connected to the second water channel 86b of the first cooling plate structure 75a and the fourth water channel 92b of the second cooling plate structure 75b. For the exemplified electrode plate 77a, the water channel 104 is connected to the inner space 98. The water channel 104 is hence in fluid communication with the inner space 98. The water channel 106 is not connected to the inner space 98.

The exemplified electrode plate 77a is a cathode. The electrode plate 77b is an anode. The electrode plate 77b is similar to the electrode plate 77a, except that the oxygen channel of electrode plate 77b is connected to the inner space instead of the hydrogen channel, and the other water channel is connected to the inner space. The dual gas flow device 73 comprises a plurality of electrode plates 77a and a plurality of electrode plates 77b, arranged alternatingly in the stack. Adjacent pairs of electrode plates 77a and 77b form electrolytic cells.

The electrode plate 77a is provided with a plurality of cooling channels 108a-108n extending through the electrode plate 77a. The cooling channels 108-108n are distributed along a peripheral portion of the electrode plate 77a. Pairs of adjacent cooling channels 108a-108n are aligned with and connected to respective connecting channels 81a-81f of the first cooling plate structure 75a. For example, cooling channels 108a and 108b are connected to the connecting channel 81a of the first cooling plate structure 75a if we assume that the face of the electrode plate 77a shown in FIG. 7 is directed towards the first cooling plate structure 75a. Pairs of adjacent cooling channels 108a-108n are aligned with and connected to respective connecting channels 88a-88g of the second cooling plate structure 75b. For example, cooling channels 108a and 108n are connected to the connecting channel 88g of the second cooling plate structure 75b with the same assumption as before regarding the direction of the face of the electrode plate 77a shown in FIG. 7. The cooling channels 108a-108n forming a pair connected to one connecting channel of the first cooling plate structure 75a do hence not necessarily form a pair connected to a connecting channel of the second cooling plate structure 75b. Each connecting channel 81a-81f and 88a-88g generally connects two adjacent cooling channels 108a-108n.

In use, the following cooling fluid circulation may be obtained with the exemplified dual gas flow device 73. A cooling fluid, typically a liquid such as water, enters the stack via the cooling fluid inlet channel 79a in the first cooling plate structure 75a and flows through the cooling channel 108n of all the electrode plates 77a and 77b arranged between the first cooling plate structure 75a and the second cooling plate structure 75b until it reaches the second cooling plate structure 75b. The cooling fluid flows into the connecting channel 88g of the second cooling plate structure 75b, which directs the cooling fluid into the cooling channels 108a of the electrode plates 77a and 77b through which the cooling fluid flows back to the first cooling plate structure 75a and into the connecting channel 81a, which directs the cooling fluid into the cooling channel 108b. The cooling fluid flows through the electrode plates 77a and 77b to the second cooling plate structure 75b and into the connecting channel 88f, which directs the cooling fluid into the cooling channels 108c through which the cooling fluid flows to the first cooling plate structure 75a, and so on. In this manner, the cooling fluid circulates through the entire stack through all the cooling channels 108a-108n and all connecting channels 81a-81f and 88a-88g. The cooling fluid hence moves along the periphery of the stack, in the present example in the counter-clockwise direction, until it reaches the cooling fluid outlet channel 79b where the cooling fluid exits the stack. In this manner, an efficient cooling of the stack may be performed.

There may be provided sealing members between the connecting channels of the first cooling plate structure 75a and the adjacent electrode plate 77a or 77b to provide a fluid seal between the first cooling plate structure 75a and the adjacent electrode plate 77a, 77b. There may be provided sealing members between the connecting channels of the second cooling plate structure 75b and the adjacent electrode plate 77a or 77b to provide a fluid seal between the second cooling plate structure 75b and the adjacent electrode plate 77a, 77b.

The concept has mainly been described above with reference to a few embodiments. However, as is readily appreciated by a person skilled in the art, other embodiments than the ones disclosed above are equally possible within the scope of the concept, as defined by the appended patent claims.

The invention claimed is:
1. A dual gas flow device comprising:
a first cooling plate structure
a second cooling plate structure,
a plurality of electrode plates,
wherein the first cooling plate structure the second cooling plate structure and the plurality of electrode plates are arranged in a stacked configuration, wherein the first cooling plate structure forms a first end of the stack and the second cooling plate structure forms a second end of the stack, wherein the plurality of electrode plates are arranged between the first cooling plate structure and the second cooling plate structure,
wherein each electrode plate comprises a plurality of cooling channels extending through the electrode plate, distributed along a peripheral portion of the electrode plate, each cooling channel being aligned with the corresponding cooling channel of the other electrode plates in the stack,
wherein each of the first cooling plate structure and the second cooling plate structure is provided with a plurality of connecting channels, each connecting channel being configured to connect, in a circumferential direction, adjacent pairs of the plurality of cooling channels of the electrode plates, whereby the first cooling plate structure forms a return path for cooling fluid at the first end of the stack and the second cooling plate structure forms a return path for cooling fluid at the second end of the stack enabling cooling fluid to flow through all of the cooling channels, wherein the plurality of connecting channels are distributed along a peripheral portion of the first cooling plate structure and along a peripheral portion of the second cooling plate structure, wherein the peripheral portion of the first cooling plate structure and the peripheral portion of the second cooling plate structure is an edge region on the front face or back face of the first cooling plate structure and second cooling plate structure, such that the cooling fluid moves along the periphery of the stack.

2. The dual gas flow device as claimed in claim 1, wherein the first cooling plate structure and the second cooling plate structure are made of a dielectric material.

3. The dual gas flow device as claimed in claim 2, wherein the dielectric material comprises one of a heat conductive polymer, ceramic, aluminium oxide and beryllium oxide.

4. The dual gas flow device as claimed in claim 1, wherein every other of the plurality of electrode plates is an anode electrode plate and the remaining of the plurality of electrode plates are cathode electrode plates.

5. The dual gas flow device as claimed in claim 1, wherein each adjacent pair of the plurality of electrode plates forms an electrolytic cell.

6. The dual gas flow device as claimed in claim 1, wherein the first cooling plate structure has a cooling fluid inlet channel connected to a first cooling channel of the cooling channels of the electrode plates and a cooling fluid outlet channel connected to a second cooling channel of the cooling channels of the electrode plates.

7. The dual gas flow device as claimed in claim 1, wherein the electrode plates have perimeter surfaces provided with heat fins.

8. The dual gas flow device as claimed in claim 2, wherein every other of the plurality of electrode plates is an anode electrode plate and the remaining of the plurality of electrode plates are cathode electrode plates.

9. The dual gas flow device as claimed in claim 2, wherein each adjacent pair of the plurality of electrode plates forms an electrolytic cell.

10. The dual gas flow device as claimed in claim 2, wherein the first cooling plate structure has a cooling fluid inlet channel connected to a first cooling channel of the cooling channels of the electrode plates and a cooling fluid outlet channel connected to a second cooling channel of the cooling channels of the electrode plates.

11. The dual gas flow device as claimed in claim 2, wherein the electrode plates have perimeter surfaces provided with heat fins.

* * * * *